(12) United States Patent
Weber

(10) Patent No.: US 10,138,653 B1
(45) Date of Patent: Nov. 27, 2018

(54) INSULATED TENT

(71) Applicant: William Christian Weber, Napa, CA (US)

(72) Inventor: William Christian Weber, Napa, CA (US)

( * ) Notice: Subject to any disclaimer, the term of this patent is extended or adjusted under 35 U.S.C. 154(b) by 0 days.

(21) Appl. No.: 15/449,069

(22) Filed: Mar. 3, 2017

Related U.S. Application Data

(60) Provisional application No. 62/303,204, filed on Mar. 3, 2016.

(51) Int. Cl.
| | |
|---|---|
| *E04H 15/54* | (2006.01) |
| *E04H 15/14* | (2006.01) |
| *E04H 15/64* | (2006.01) |
| *E04H 15/00* | (2006.01) |
| *E04H 15/40* | (2006.01) |
| *B32B 5/26* | (2006.01) |

(52) U.S. Cl.
CPC ............ *E04H 15/54* (2013.01); *E04H 15/001* (2013.01); *E04H 15/14* (2013.01); *E04H 15/64* (2013.01); *B32B 5/26* (2013.01); *B32B 2255/205* (2013.01); *B32B 2307/304* (2013.01); *E04H 15/405* (2013.01)

(58) Field of Classification Search
CPC .............................. E04H 15/001; E04H 15/14
See application file for complete search history.

(56) References Cited

U.S. PATENT DOCUMENTS

| | | | | |
|---|---|---|---|---|
| 3,024,717 | A | * 3/1962 | Rozek | ......... F24F 7/00 135/115 |
| 3,148,688 | A | * 9/1964 | Arnopole | ......... E04H 15/14 135/117 |
| 3,164,078 | A | * 1/1965 | Sheng | ......... E04H 15/14 135/120.1 |
| 4,165,757 | A | 8/1979 | Marks | |
| 4,308,882 | A | * 1/1982 | Pusch | ......... E04H 15/54 135/87 |
| 4,614,684 | A | 9/1986 | Ebneth | |
| 4,657,807 | A | 4/1987 | Fuerstman | |
| 4,884,589 | A | * 12/1989 | Simpson | ......... E04H 15/001 135/117 |
| 4,898,085 | A | * 2/1990 | Jarnot | ......... F24F 7/00 135/93 |
| 5,316,837 | A | 5/1994 | Cohen | |
| 5,599,585 | A | 2/1997 | Cohen | |

(Continued)

FOREIGN PATENT DOCUMENTS

| | | | | |
|---|---|---|---|---|
| FR | 2982896 A1 | * 5/2013 | ............ | E04H 15/14 |
| WO | WO 2015057869 A1 | * 4/2015 | ............ | E04H 15/14 |

*Primary Examiner* — David R Dunn
*Assistant Examiner* — Danielle Jackson
(74) *Attorney, Agent, or Firm* — Edward S. Sherman

(57) ABSTRACT

A collapsible tent with quilted reflective covering fabric is formed from a plurality of hubs that connect outward extending struts. The struts define the shape of the walls and roof by supporting an expanse of at least translucent fabric extending from a hub are disposed in the center of each sidewall of the tent and a polygonal slanted roof. The strut ends from the slanted roof panels are held in stitched elongated pockets at the roof corners which are adjacent the stitched pockets that support sidewall struts. The tent has sealable vents and portal for one or more of power cords, ventilations ducts and water or drains hoses.

13 Claims, 16 Drawing Sheets

(56) References Cited

U.S. PATENT DOCUMENTS

| | | |
|---|---|---|
| 5,855,980 A | 1/1999 | Roualdes |
| 6,191,056 B1 | 2/2001 | Vogt |
| 6,258,758 B1 | 7/2001 | Greer |
| 6,296,415 B1 | 10/2001 | Johnson et al. |
| 6,516,823 B1 | 2/2003 | Glover |
| D511,196 S | 1/2005 | Wehner |
| D535,350 S | 1/2007 | Ju |
| D536,761 S | 2/2007 | Wehner |
| 7,216,657 B2 * | 5/2007 | Choi ................ E04H 15/16 135/117 |
| 7,455,069 B2 * | 11/2008 | Sumner .............. E04H 15/32 135/117 |
| D605,723 S | 12/2009 | Rausch |
| 7,882,849 B2 * | 2/2011 | Franta ............... E04H 15/001 135/115 |
| 8,395,093 B1 | 3/2013 | Auffinger, III et al. |
| 8,424,118 B2 | 4/2013 | Maxey et al. |
| 8,448,656 B2 | 5/2013 | Choi |
| 8,453,270 B2 | 6/2013 | Blackford |
| D689,158 S | 9/2013 | Lucero |
| D725,211 S | 3/2015 | Lah |
| D725,212 S | 3/2015 | Lah |
| 9,315,937 B2 | 4/2016 | Gedanken et al. |
| 9,340,994 B2 * | 5/2016 | Hotes .................. E04H 15/36 |
| 9,410,342 B2 * | 8/2016 | Napier ................ E04H 15/14 |
| 9,512,632 B2 * | 12/2016 | Cook .................. E04H 15/54 |
| 2003/0219537 A1 | 11/2003 | Betts, III |
| 2006/0141015 A1 | 6/2006 | Tessier et al. |
| 2006/0147696 A1 | 7/2006 | Crowley |
| 2006/0169309 A1 * | 8/2006 | Brackins ............. E04H 15/001 135/119 |
| 2007/0227571 A1 | 10/2007 | Youn |
| 2008/0022620 A1 | 1/2008 | Crowley |
| 2008/0047061 A1 * | 2/2008 | Peck .................... E04H 15/20 5/413 AM |
| 2008/0083443 A1 * | 4/2008 | Eastman, II ........ E04H 15/44 135/121 |
| 2011/0159764 A1 | 6/2011 | Price |
| 2011/0168221 A1 * | 7/2011 | Schlipf ............... E04H 15/48 135/143 |
| 2012/0279540 A1 | 11/2012 | Jin |
| 2013/0074894 A1 * | 3/2013 | Cook .................. E04H 15/54 135/96 |
| 2013/0276846 A1 * | 10/2013 | Courtney ............ E04H 15/56 135/121 |
| 2015/0197869 A1 | 7/2015 | Kroener |
| 2015/0257314 A1 | 9/2015 | Creasy, Jr. |
| 2016/0237714 A1 * | 8/2016 | Tufto .................. E04H 15/44 |

\* cited by examiner

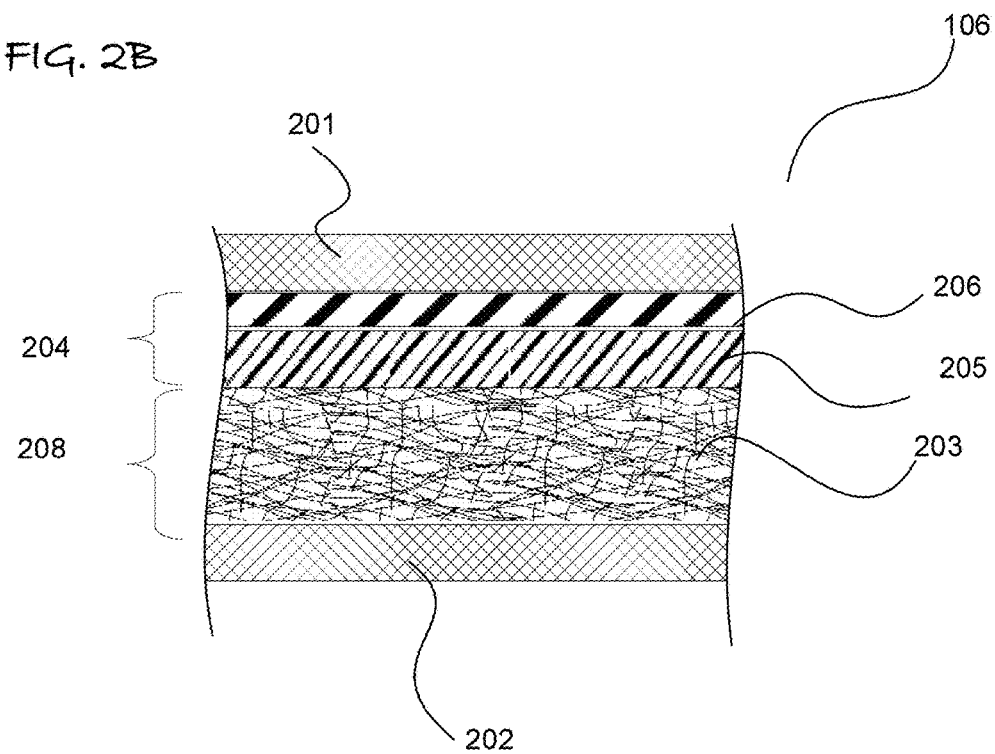
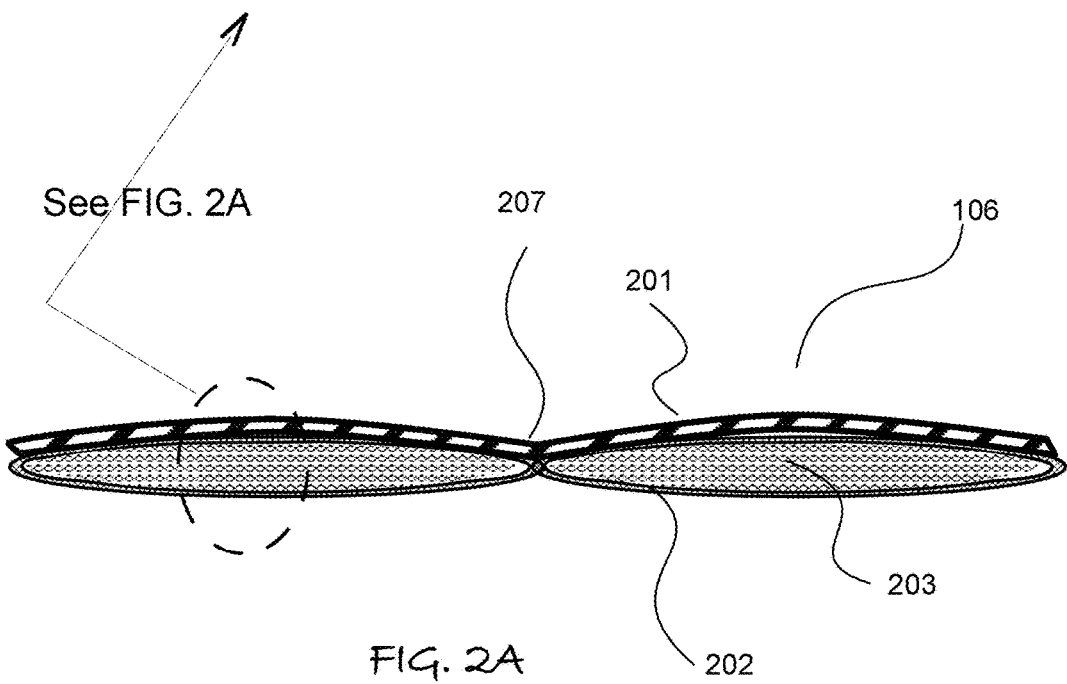

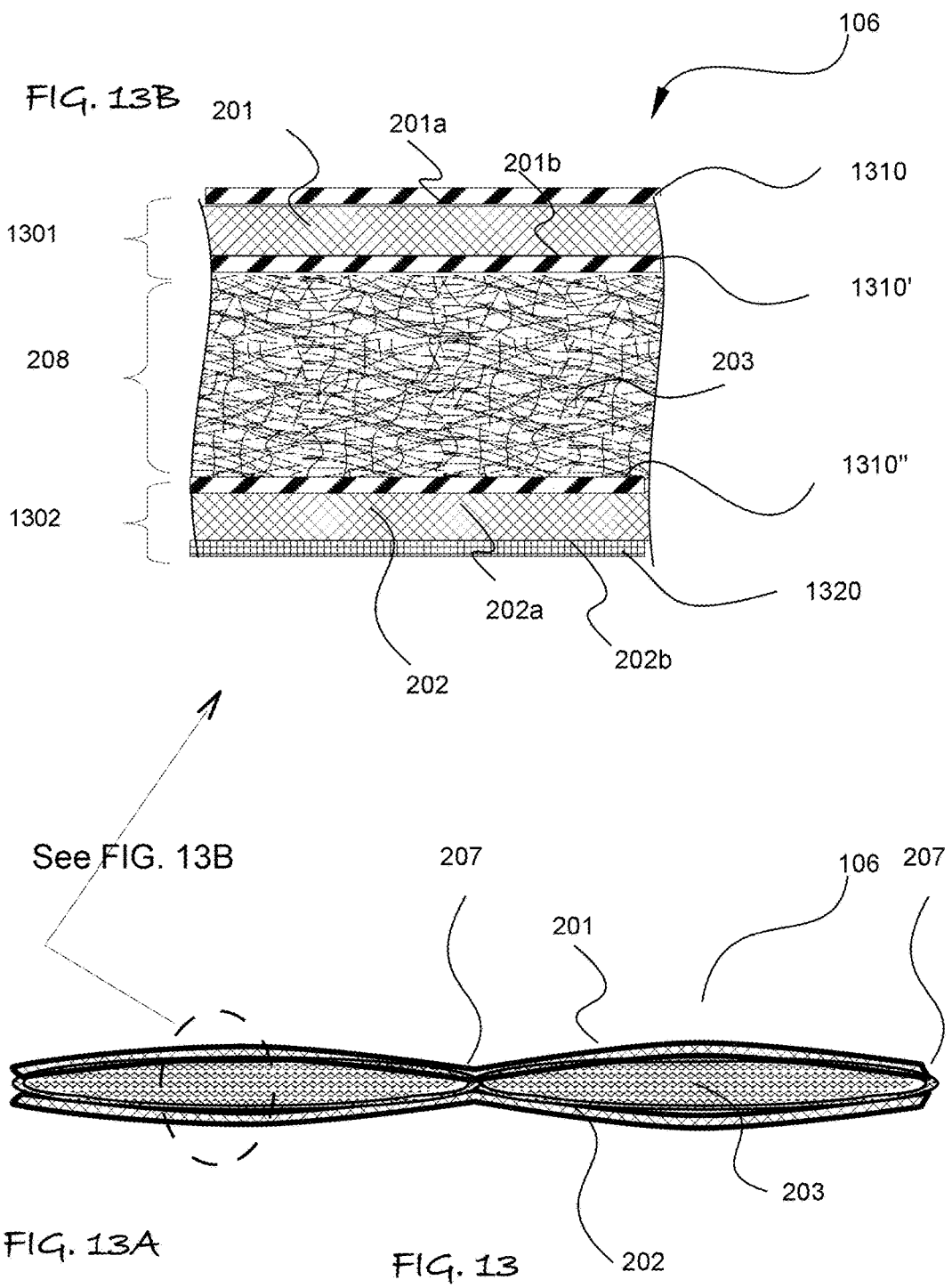

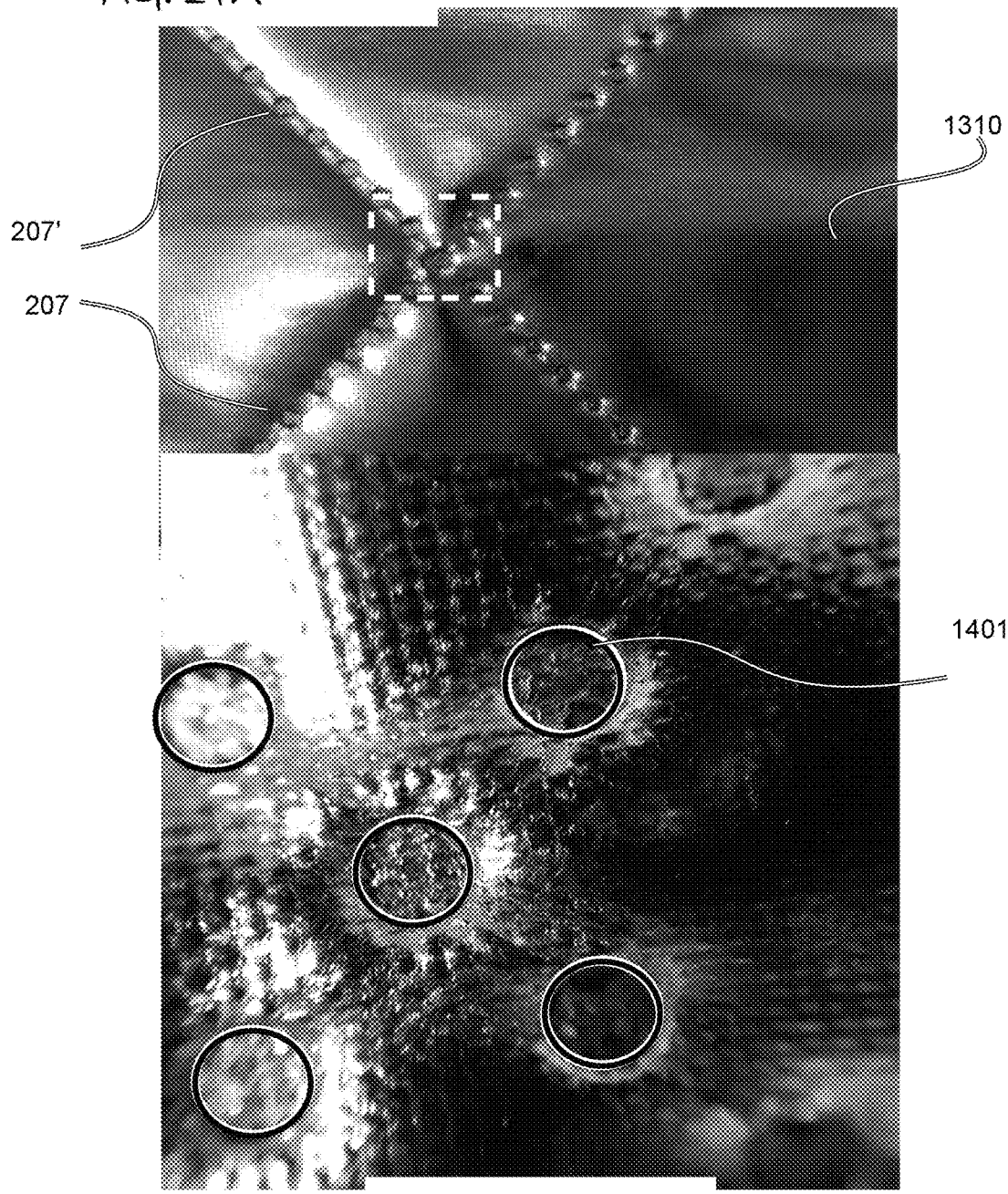

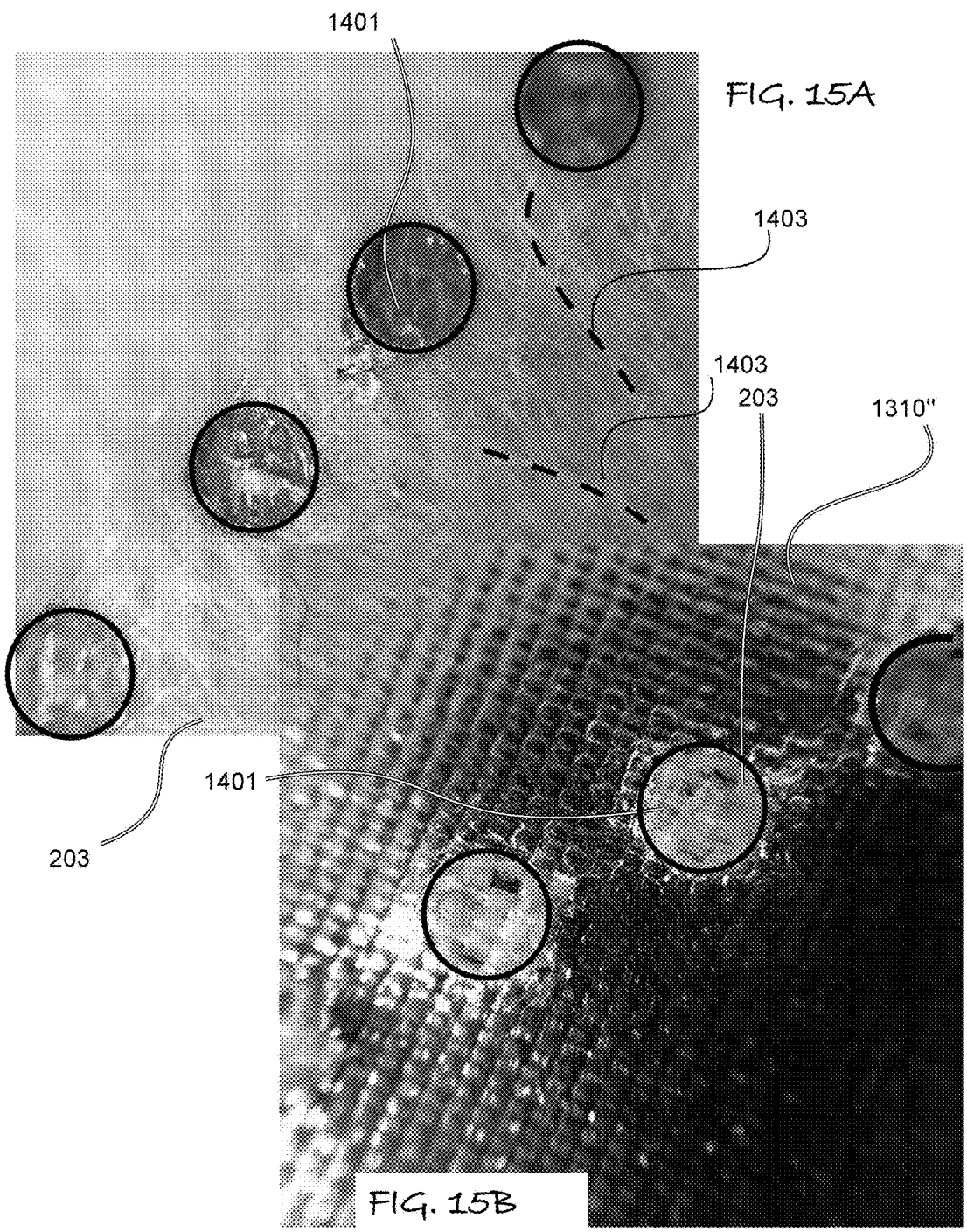

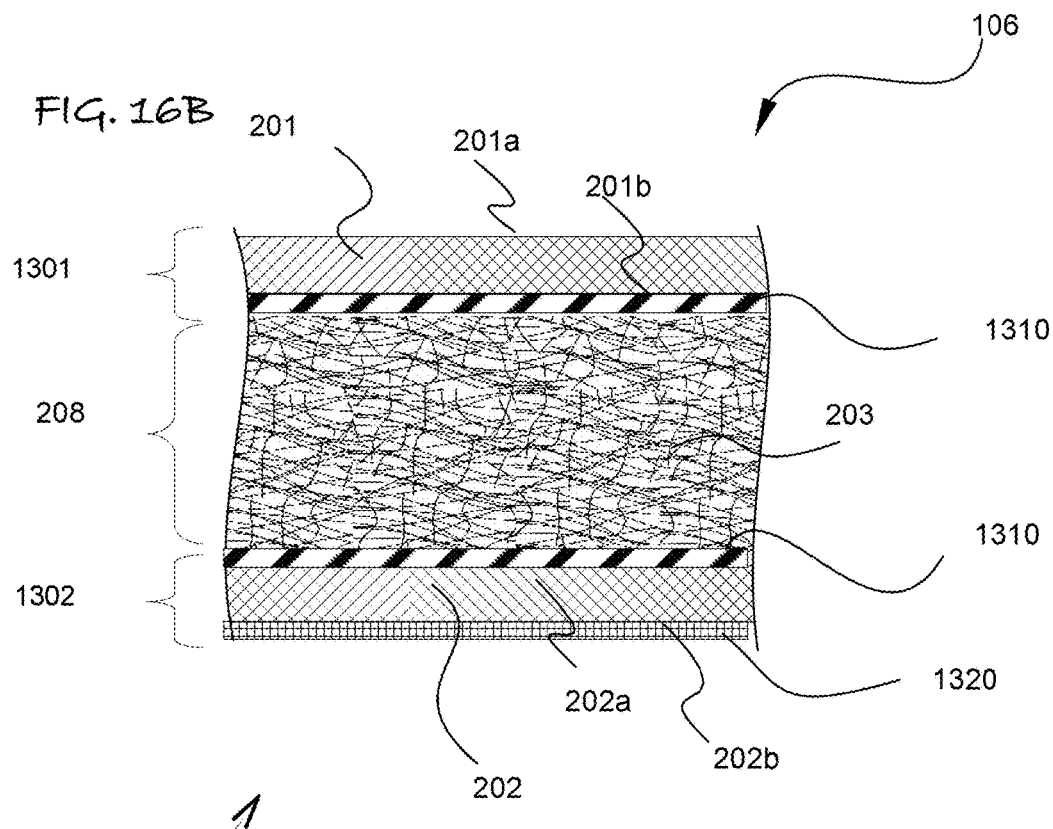
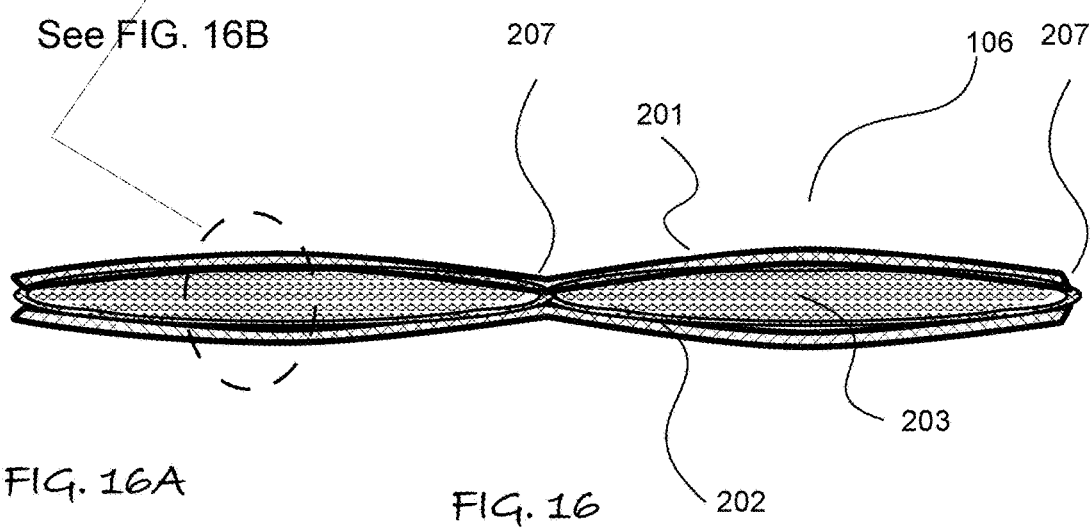

INSULATED TENT

CROSS REFERENCE TO RELATED APPLICATIONS

The present application claims the benefit of priority to the US Provisional patent application of the same title that was filed on Mar. 3 2016, having application No. 62/303,204, and is incorporated herein by reference.

BACKGROUND OF INVENTION

The field of inventions is portable structures, and more particularly an insulated portable shelter.

Tents are frequently used as portable shelters, but the insulating qualities are limited by the fabric. While heavier fabrics can be used, they require sturdier structures making the tent heavier and less portable.

It would be desirable to have a portable shelter that can be set up easily like a tent, but also be provisioned with heating and cooling sources for year round use, as well as use in extreme climate and terrains such as desert conditions, which have extremes of day and night temperature.

The above and other objects, effects, features, and advantages of the present invention will become more apparent from the following description of the embodiments thereof taken in conjunction with the accompanying drawings.

SUMMARY OF INVENTION

In the present invention, the first object is achieved by providing a collapsible insulated tent structure comprising a frame that comprises a roof formed with a centrally disposed roof hub at an apex, the hub having 3 or more hinged outwardly extending struts, with each adjacent pairs of strut supporting a portion of a flexible fabric cover member by forming a triangular downward sloping roof panel, three or more sides walls formed of the cover member, each sidewall extending downward from an upper side at an edge of the roof panel and supported by a centrally disposed sidewall hub having at least three hinged outwardly extending struts, wherein the cover member has a plurality of elongated pocket sets, the pocket in each set extending from a common proximal end to receive and secure the distal end of the approaching struts from the roof and sidewall hubs, wherein at least a portion of the flexible fabric cover is a reflective fabric.

A second aspect of the invention is characterized by such collapsible insulated tent structure wherein the reflective fabric has one or more layers of a metallic or Infrared radiation reflecting materials.

Another aspect of the invention is characterized by any such collapsible insulated tent structure wherein the reflective fabric is a quilted insulated fabric that has quilted pockets that are formed by heat sealing an external fabric layer to one or more additional layers.

Another aspect of the invention is characterized by any such collapsible insulated tent structure wherein the quilted pockets are formed by a series of crossing seam lines bonding an interior fabric layer to the exterior fabric layer.

Another aspect of the invention is characterized by any such collapsible insulated tent structure wherein the interior fabric layer and the interior fabric layer are both covered by one or more metallic layers.

Another aspect of the invention is characterized by any such collapsible insulated tent structure wherein the reflective fabric has quilted pockets defined by seams having a linear sequence of adjacent dot like weld point that bond an external fabric layer to one or more additional layers, wherein the dots like weld point are spaced apart.

Another aspect of the invention is characterized by any such collapsible insulated tent structure wherein further comprising of or more of vents and covered sealable portals on one or more side walls.

Another aspect of the invention is characterized by any such collapsible insulated tent structure wherein the reflective quilted insulated fabric has a metallized outer layer disposed on an exterior fabric layer and a batting fiber layer disposed within quilted pockets formed by a series of crossing seam lines bonding an interior fabric layer to the exterior fabric layer.

Another aspect of the invention is characterized by any such collapsible insulated tent structure wherein the reflective quilted insulated fabric has at least one Infrared reflective layer disposed on one of an exterior fabric layer, an interior fabric layer opposing the exterior fabric layer, and a plastic film disposed between the exterior the exterior fabric layer and the interior fabric layer.

Another aspect of the invention is characterized by a collapsible insulated tent structure comprising a frame that comprises a roof formed with a centrally disposed roof hub at an apex, the hub having 3 or more hinged outwardly extending struts, with each adjacent pairs of strut supporting a portion of a flexible fabric cover member by forming a triangular downward sloping roof panel, three or more sides walls formed of the cover member, each sidewall extending downward from an upper side at an edge of the roof panel and supported by a centrally disposed sidewall hub having at least three hinged outwardly extending struts, wherein the cover member has a plurality of elongated pocket sets, the pocket in each set extending from a common proximal end to receive and secure the distal end of the approaching struts from the roof and sidewall hubs, wherein at least a portion of the flexible fabric cover is a quilted insulated fabric.

Another aspect of the invention is characterized by any such collapsible insulated tent structure wherein the flexible fabric cover has one or more vent opening with a mesh screen covering the opening, the mesh screen having inner and outer screen members to define a pocket for receiving a filter.

Another aspect of the invention is characterized by any such collapsible insulated tent structure wherein the vent opening has an outer cover attached to an upper end and adjacent opposing side of the flexible fabric cover that surround the vent opening in which the outer cover extends away from the vent opening so that it is operative to direct away precipitation away from the vent opening.

Another aspect of the invention is characterized by any such collapsible insulated tent structure wherein the flexible fabric cover has one or more openings, in which at least one opening has an outer cover attached to an upper end and adjacent opposing side of the flexible fabric cover that surround the opening in which the outer cover extends away from the opening so that it is operative to direct away precipitation away from the vent opening.

Another aspect of the invention is characterized by any such collapsible insulated tent structure further comprising one or more windows openings in the flexible fabric cover, in which one or more of the window openings has a mesh screen covering the opening and an at least partially removable inner flat disposed inside the tent about the opening opposite the mesh screen and further comprising an outer trough disposed below and about a lower perimeter portion of the mesh screen to collect precipitation, the trough having one or more penetrations at a bottom to drain said precipitation that may collect in the trough.

Another aspect of the invention is characterized by any such collapsible insulated tent structure in which trough is formed from flexible impermeable fabric that attaches to the flexible fabric cover at the lower perimeter portion of the screen opening.

Another aspect of the invention is characterized by any such collapsible insulated tent structure wherein the flexible fabric cover has two or more vent openings, each vent opening having attached about a perimeter of the vent opening a fabric cone configured to expand and contract to seal a ventilation duct that extend from outside the tent structure via each of the two or more vent opening.

Another aspect of the invention is characterized by any such collapsible insulated tent structure further comprising an inner flap disposed on an interior of the flexible fabric cover in detachable engagement over the two or more vent opening to protect the insulated tent structure from an external environment when the ventilation ducts is not disposed in each of the two or more vent openings.

Another aspect of the invention is characterized by any such collapsible insulated tent structure wherein the fabric cones are configured to seal and fix in place a ventilation duct by an elastic closure ring.

Another aspect of the invention is characterized by any such collapsible insulated tent structure that further comprises at least one outer cover attached to an upper end and adjacent opposing sides on the exterior of the flexible fabric cover about at least one vent opening in which the outer cover extends away from the vent opening so that it is operative to direct away precipitation away from the vent opening.

Another aspect of the invention is characterized by any such collapsible insulated tent structure in which a single outer cover is attached to the exterior of the flexible fabric to extend over two adjacent vent openings, each vent opening having attached about a perimeter a fabric cone configured to expand and contract to seal a ventilation duct that extend from outside the tent structure via each of the two or more vent opening.

The above and other objects, effects, features, and advantages of the present invention will become more apparent from the following description of the embodiments thereof taken in conjunction with the accompanying drawings.

BRIEF DESCRIPTION OF DRAWINGS

FIG. 2A is a schematic cross-sectional elevation view of the quilted reflective fabric used to cover the insulated tent in FIG. 1, and FIG. 2B is a schematic enlarged view of a portion of the fabric of FIG. 2A.

FIG. 3A is a top plan view of the tent of FIG. 1, whereas

FIG. 4A is a perspective view of an interior portion showing the connection of the framing hub spokes to the fabric whereas

FIG. 13A is a schematic cross-sectional elevation view of an alternative embodiment of the quilted reflective fabric that can be used to cover the insulated tent in FIG. 1, and FIG. 13B is a schematic enlarged view of a portion of the fabric of FIG. 13A.

FIGS. 14A and 14B are photographs in plan view of the outer cover to show a preferred form of the welded seams between the opposing inner and outer fabric layers, in which FIG. 14B is a higher magnification photograph of a portion of FIG. 14A.

FIG. 15A and FIG. 15B are photographs in plan view comparing opposing in and outer fabric layers after they are deliberated separated to reveal the internal structure of the quilted fabric adjacent the welded seams in FIGS. 14 and 14B.

FIG. 16A is a schematic cross-sectional elevation view of an alternative embodiment of the quilted reflective fabric that can be used to cover the insulated tent in FIG. 1, and FIG. 16B is a schematic enlarged view of a portion of the fabric of FIG. 16A.

DETAILED DESCRIPTION

Figure 1:
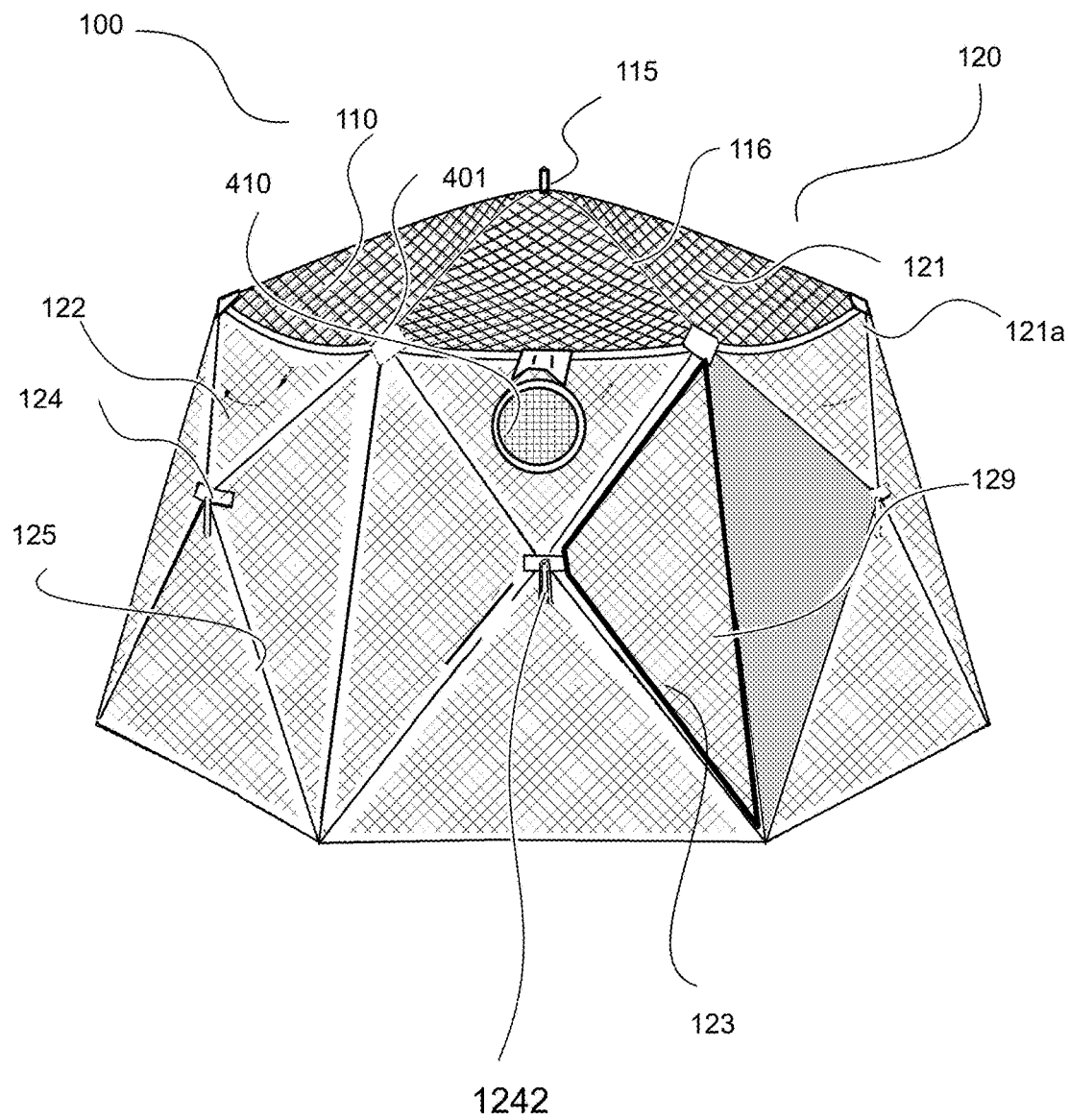
FIG. 1 is a perspective view of the insulated tent in a photograph that illustrates the insulating cover, in which the view shows 2 of 6 sides and a portion of the top.
Figure 3A:
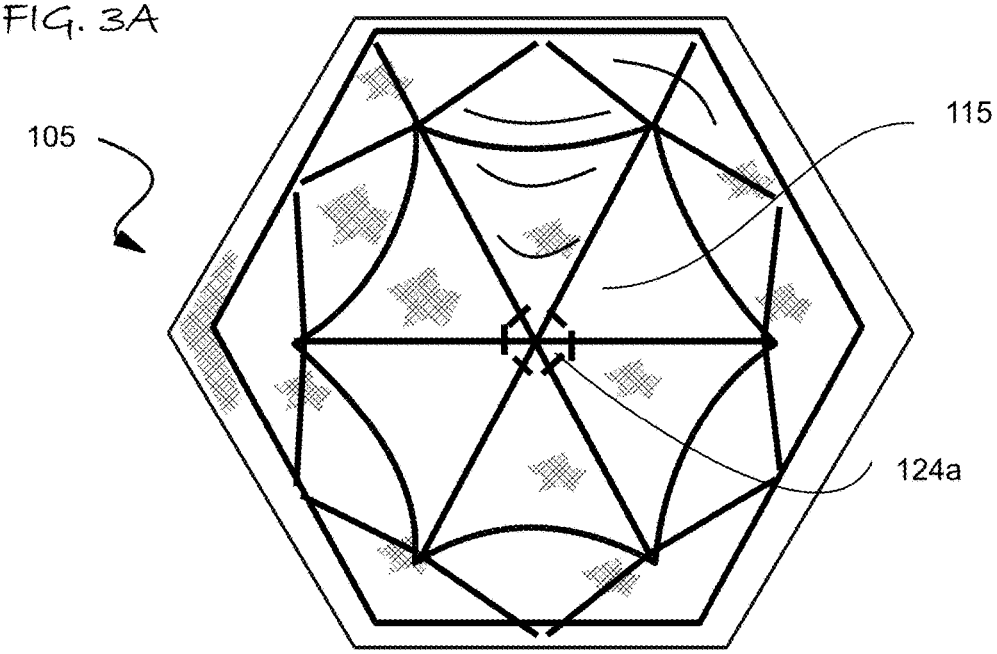
Figure 3B:
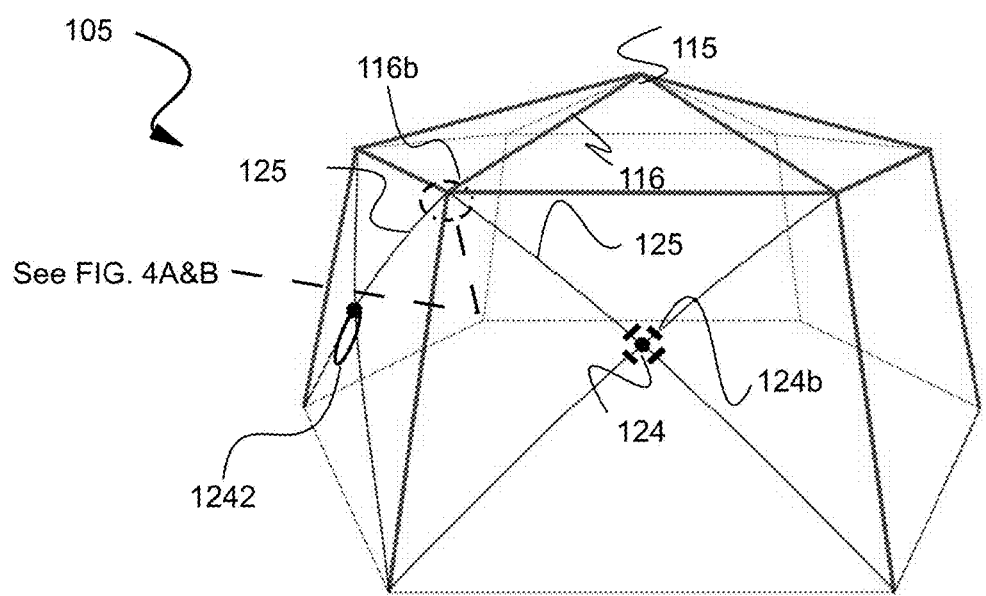
FIG. 3B is a schematic perspective view of the frame structure of the tent of FIGS. 1 and 3A.
Figure 4B:
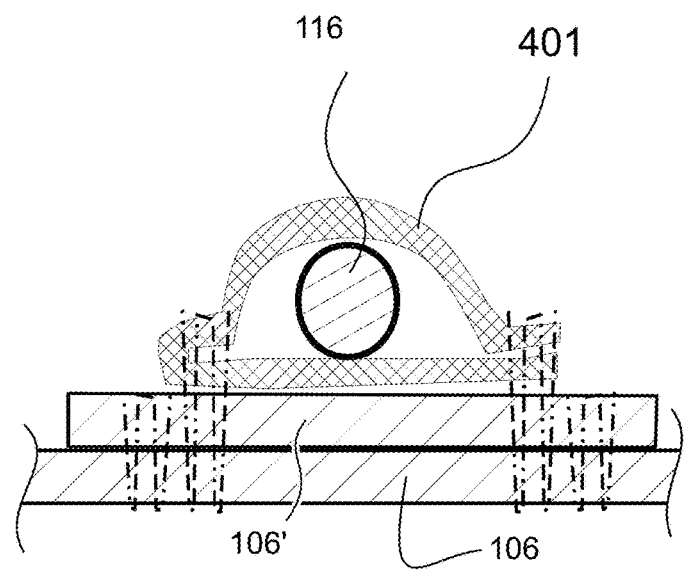
FIG. 4B is a cross-sectional elevation view at section line B-B in FIG. 4A.
Figure 4A:
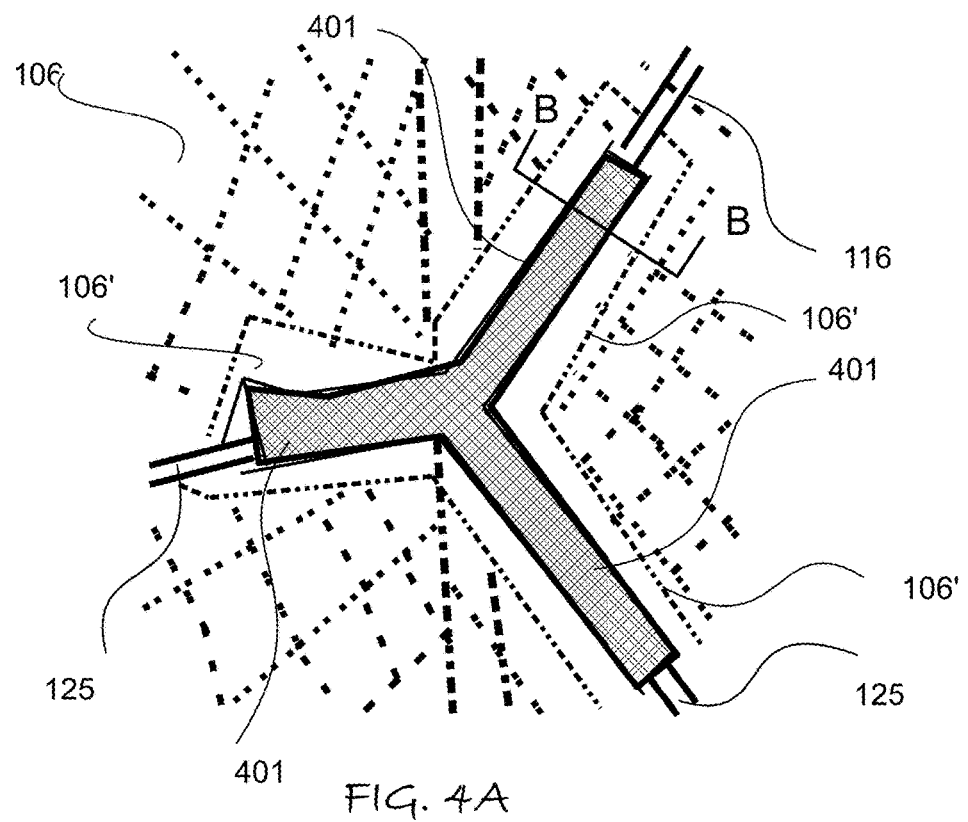

Referring to FIGS. 1 through 16B, wherein like reference numerals refer to like components in the various views, there is illustrated therein a new and improved Portable Insulated tent, generally denominated 100 herein.

In accordance with the present invention Portable Insulated tent 100 comprises a roof 110 which is optionally formed with a centrally disposed roof hub 115 at an apex, the hub 115 having six hinged outwardly extending spokes 116, with each adjacent pairs of spokes 116 supporting a portion of a flexible fabric cover member 120 by forming a triangular downward sloping roof panel 121. The hub 115 can deploy more or less struts to form more or fewer roof segments.

The portable insulated tent 100 preferably has six sides walls 122 formed of the cover member 120, each sidewall extending downward from an upper side at an edge 121a of the roof panel 121 and supported by a centrally disposed sidewall hub 124 having four hinged outwardly extending struts 125.

The cover member 120 is a preferably a quilted fabric having a reflective coating or layer on the tent outer layer 106 covering the roof 110 defined by frame 105 and sidewall 122. The frame 105 is defined by the connected struts that extend outward in hinged engagement with each hub, and the connection to the cover 120.

A construction for the tent outer layer 106 that deploys a quilted fabric having a reflective coating is illustrated in FIGS. 2A and 2B, in which an upper and lower fabric layer 201 and 202 contain an filler or batting 203, such as within the open pockets 208 forming by stitching or heat welded seams 207 that form closed rectangles, such as squares, parallelograms and the like. A metallized plastic film 204 is preferably interposed between the batting 203 and the outer fabric 201, with the plastic side 205 preferred disposed against the batting 203, to place the reflective metal layer 206 adjacent to the inner surface 201b of the outer fabric layer 201. A metallized plastic film 204 makes the outer surface of the covering reflective of infrared light improving the thermal insulating properties.

Another preferred construction is illustrated in FIG. 13 in which the tent outer layer 106 has a quilted construction of the metallized fabric which has 2 fabric layers, the outer fabric 201 and the inner fabric 202. The outer fabric 201 is coated on the outside surface 201a and inside surface 201b reflective coating, such as metallic or reflective flake filled paint or elastomeric coating 1310 on the outside, which is on fabric layer 201 outer surface 201a. The opposing side 201b of the outer fabric 201 may also have a reflective metallic coating 1310' to form a fabric member 1301. By inner surface, coating or layer or inner facing coating or layer surface, we mean a surface generally most proximal to the inside are bounded by the opened tent 100 in use, as compared to the outer or outer facing surface, layer or coating being more proximal to the exterior we mean more proximal to exterior of the open tent 100, that is the environment, than the more distal interior or interior facing surface, coating or layer, and the like.

The inner fabric 202 is also coated on the outside surface 202a with a reflective coating, such as metallic or reflective flake filled paint or elastomeric coating 1310", to form a second fabric member 1302.

The metallic layers 1301, 1301' and 1301" can be the same or of different compositions and thicknesses, as may be needed for durability, insulating and vapor or liquid barrier properties. Alternatively, fabric layer 201 and 202 can be the same or different for similar reasons, as well as to be bond or adhere a coating, such as a metallic coating or the optional anti-bacterial coating.

Fabric member 1301 and 1302 contain a fibrous filler or batting 203, such as within pockets 208 forming by stitching or heat welded seams 207 that cross to form closed rectangles, but optionally also may form squares, parallelograms and the like closed geometric shapes that can be regular or irregular. The batting layer 203 can be a fluff of natural or synthetic fiber, or mixtures thereof, which may be entangled and expanded primary to maintain the pockets 208 between seams 207 open.

The inner surface 202b of the inner fabric 202 may be coated with one or more additional layer 1320. Such an additional layer 1320 is preferably an anti-bacterial coating, such as a paint or elastomer filled with anti-bacterial materials, such as particulate or flake or Copper or Silver. Preferably such filler is nano-particles of Silver. Other inorganic anti-bacterial agents that may be used as coating for the fabric include, without limitation Zinc and Magnesium, as well as the oxides of any of these material, that is AgO, CuO, ZnO, MgO, in any of particulate, flake or nano-particle form. Methods of apply such anti-bacterial coating to fabrics are disclosed in issued U.S. Pat. No. 9,315,937B2 (issued 2016 Apr. 19) for Sonochemical coating of textiles with metal oxide nanoparticles for antimicrobial fabrics" by Gedanken, A. et al as well as in the US Patent application No. US2006/0141015A1 (published 2006 Jun. 29) for "Antimicrobial material" by Tessier, D et al., both of which are incorporated herein by reference.

Various type and methods of providing pliable metallic and reflective coating to fabrics are disclosed in US Patent documents that follow: US2015/0257314A1 (published on 2015 Sep. 10) for COATINGS AND METHODS FOR PROVIDING FABRICS WITH FAUX METAL PLATINGS" to Creasy, J R., Larry Don; US2015/0197869A1 (published on 2015 Jul. 16) for METHOD FOR FABRICATING A HEAT SINK, AND HEAT SINK" to Kroener, Friedrich; U.S. Pat. No. 8,424,119B2 (published on 2013 Apr. 23) for "Patterned heat management material" to Blackford, Michael E. "Woody"; US2011/0159764A1 (published on 2011 Jun. 30) for METHODS OF IMPARTING CONDUCTIVITY TO MATERIALS USED IN COMPOSITE ARTICLE FABRICATION & MATERIALS THEREOF" to Price, Richard Thomas; U.S. Pat. No. 8,453,270B2 (published on 2013 Jun. 4) for "Patterned heat management material" to Blackford, Woody; U.S. Pat. No. 8,395,093B1 (published on 2013 Mar. 12) for "Conductive elastomeric heater with expandable core" for Auffinger, III, Frank; US2008/0022620A1 (published on 2008 Jan. 31) for "FLEXIBLE WEATHER RESISTANT BUILDING WRAP" to Crowley, Shawn; US2006/147696A1 (published on 2006 Jul. 6) for "Metallized heat resistant material with thermal barrier" to Crowley, Shawn Kelly; US2003/0219537A1 (published on 2003 Nov. 27) for "Process for coating or plating fur, feathers, hair, thread, yarn ribbons and fabric with metal" to Betts III, John Frederick; U.S. Pat. No. 6,191,056B1 (published on 2001 Feb. 20) for "Primer coating providing a metallized fabric exhibiting improved washfastness" to Vogt, Kirkland W.; U.S. Pat. No. 6,258,758B1 (published on 2001 Jul. 10) for "Catalyzed surface composition altering and surface coating formulations and methods" to Greer, F. Conrad; U.S. Pat. No. 5,855,980A (published on 1999 Jan. 5) for "Fabric for clothing industry and interior furnishing" to ROUALDES BRUNO; U.S. Pat. No. 5,316,837A (published on 1994 May 31) for "Stretchable metallized nonwoven web of non-elastomeric thermoplastic polymer fibers and process to make the same" to Cohen Bernard; U.S. Pat. No. 5,599,585A (published on 1997 Feb. 4) for "Process to make an elastomeric metallized fabric" also to Cohen, Bernard; U.S. Pat. No. 4,657,807A (published on 1987 Apr. 14) for "Bright metalized fabric and method of producing such a fabric" to Fuerstman Myron M. and U.S. Pat. No. 4,614,684A (published on 1986 Sep. 30) for "Reinforced composite comprising resin impregnated metallized polyaramide fabric and method of making same" to Ebneth, Harold, all of which are incorporated herein by reference.

The seams 207 can be continuous, but are preferably a discontinuous series of welded spots 1401 to maintain flexibility. Preferably the seams 207 are formed by ultrasonic welding a series of adjacent dots about 0.5-1 mm in diameter, with a spacing of about 1 to 5 mm. The batting 203 should be sufficiently inter-tangled and/or bonded to the interior or exterior portion of the tent outer layer 106 so that it will not migrate through the space between the welded dots. The welded dots, though thicker and less flexible than the area between them and between the crossing seems 207 and 207' make up less than about half the seam 207 length.

The arrangement of the weld or seam 207 is illustrated in the photograph in FIG. 14A showing a plan view. The ultrasonic welds are formed via local heating and compression on the contacting ultrasound horn, which cause the flow and adhesion of the thermo-plastic materials in the construction of FIGS. 2, 13 and 16 at the weld or seam 207. It is preferable that that one or more layers in the flexible fabric construction is a thermoplastic to bond to the other layers.

However, to the extent such layers are not thermoplastic, thermally activated adhesive may be or dispersed on the batting, either as particulate, fibers, fiber coating or additional coating layers on the inside layers that face the batting 203. At least one of the layers in FIGS. 2, 13 and 16 preferably makes the tent outer layer 106 imperious to water and other fluids, and this layer is preferably outer layer 1301. FIGS. 15A and 15B compare the weld or seam 207 at a higher magnification after deliberate physical separation. The batting fiber 203 remain in the former pockets 208 in FIG. 15A, while the opposing side of the weld in FIG. 15B shows the metallic coating 1310" with some fibers in the batting 203 still adhered to the separated weld spots 1401. Not wishing to be bound by theory, it is believed the batting 203 may more strongly bond to the side or layer contacted with the ultrasonic horn, where it penetrates deeper into a slightly hot thermoplastic material so that more of the long inter-tangled fibers remain attached when the weld is deliberately separated. It should be apparent from FIG. 15A, the individual fibers 1403 are generally longer than the gap between adjacent spots or welds 1401. Two such fibers 1403 are marked by curved broken line. The spacing between adjacent fibers 1403 cross and inter-tangle is generally smaller than the gap between adjacent spots or welds 1401.

FIGS. 16A and 16B schematically illustrate an alternative embodiment of the tent outer layer 106 in which the outer fabric 201 does not have an external metallized layer 1301. It should also be appreciated that the outer layer 201a need not have a bright reflective appearance, that is appear silver like, but still reflect external IR light or radiation. It may contain a resin binding the reflective pigments, and the resin may be colored with a soluble dye or particulate dye particles.

It should also be appreciated that any of the embodiments may also deploy the metal coated plastic film 204 illustrated in FIG. 2 in the interior between the outer and inner fabric layers 201 and 202. As a purpose of the metal coated plastic film is to reflect Infrared Radiation (IR), plastic films coated with multi-layer dielectric or metal and dielectric IR reflective coating can be used.

It should also be appreciated that the interior fabric 202 and exterior fabric 201 are selected to have a dense weave so that a metal coating layer more easily fills the pores between the weft and the waft of the fabric. The coating layers are sufficiently thick to seal and add sufficient stiffness to make some components of the tent relatively self supporting. However, the coating layers, interior fabric and exterior fabric, batting and an additional layers are sufficiently thin that that the tent 100 can be folded to collapse on and between the spokes 116 and struts members 125. The batting 203 adds sufficient body or firmness the tent outer layer 106 that normal folding and unfolding will not damage or crease the interior or exterior fabric or initial de-lamination of any of the metallic coating layer, as very small radius of curvature folds are precluded from forming.

Figure 8:
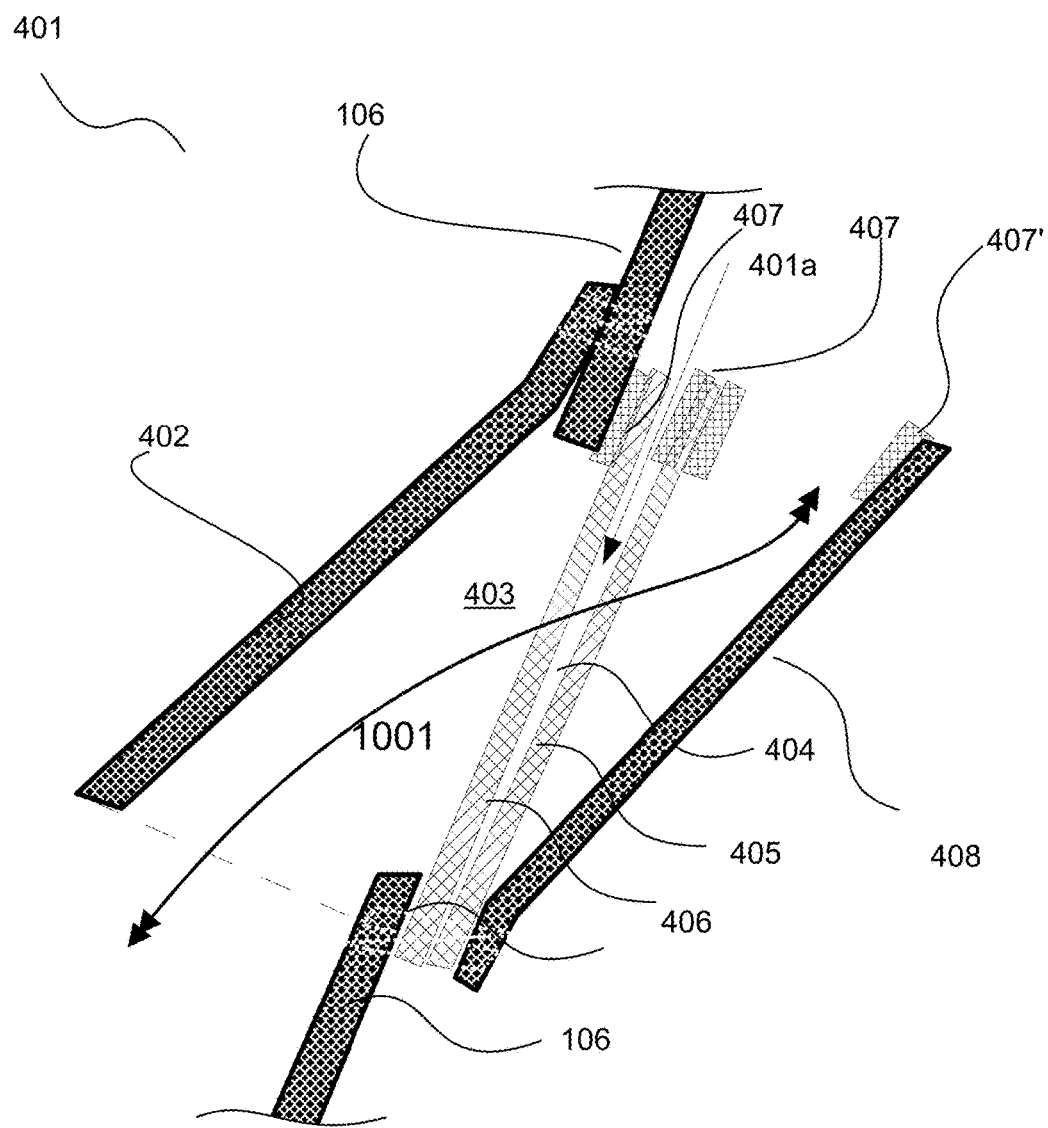
FIG. 8 is a schematic cross-sectional elevation view of the vents in FIGS. 1 and 7.
Figure 9:
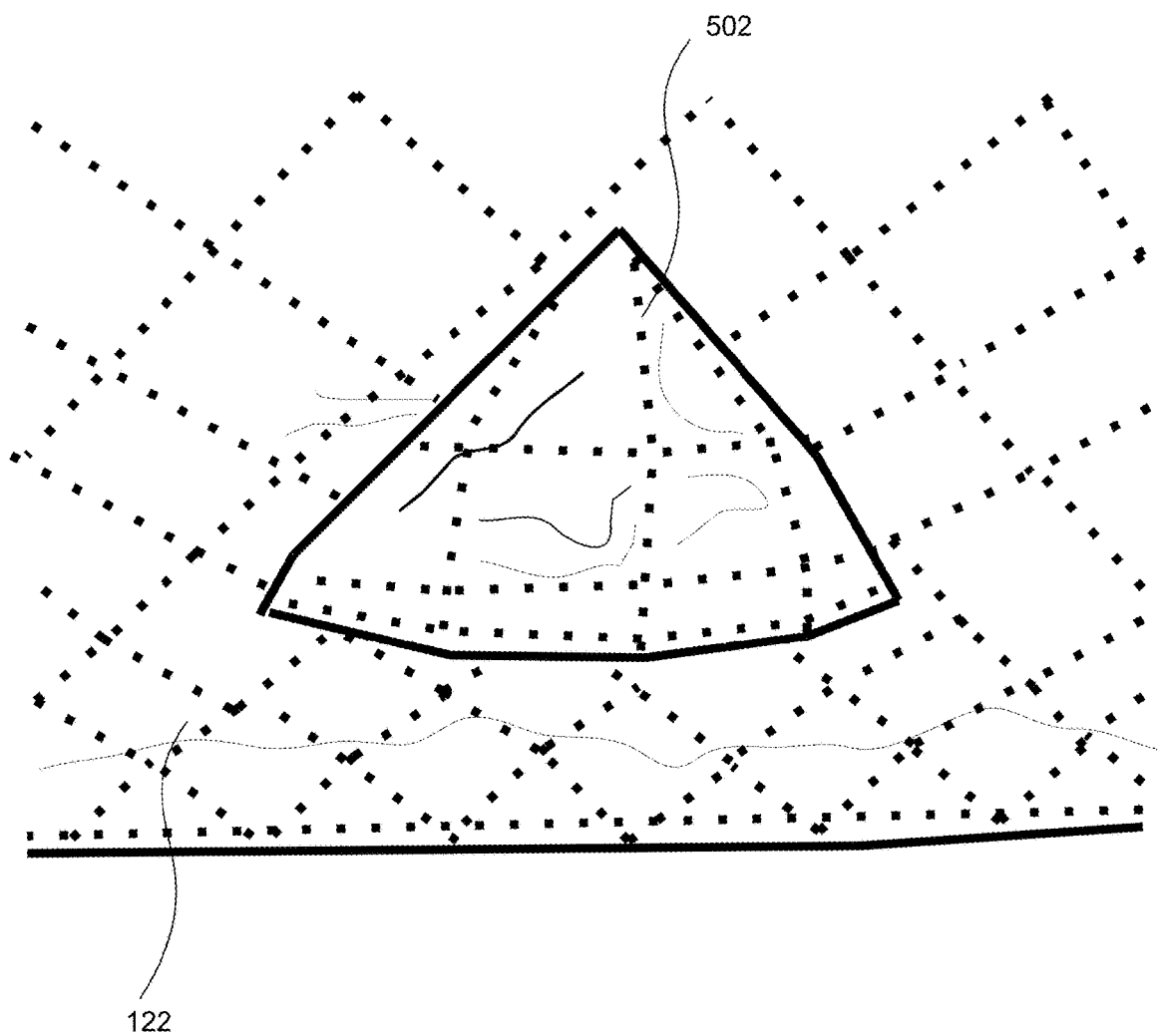
FIG. 9 is a perspective view of an exterior portion of the tent of FIG. 1 showing a cover for an electric cord.

The hubs 115 and 124 are preferably attached to the insulated tent cover 120 as illustrated in FIG. 8-9 of the commonly owned provisional patent application No. 62/291,838 (which was filed on 5 Feb. 2016) which was attached as an appendix to the priority document recited in the Cross-reference to related applications section, at the first page of this application, and is also incorporated herein by reference. Additional strong fabric layers 401 are provided in the form of attached tubes that receive the end of the spokes 116 at common intersection at tent apexes. As shown in the section view in FIG. 4B, the tent outer layer 106 can have an extra layer of the tent fabric material inner layer 106' stitched to the bases of the tent outer layer 106 to provide reinforced strength to withstand the force exerted on the attached tubes or pockets 401 by the spokes 116. The tubes 401 can be defined by folding the fabric or stitch rectangles of fabric at both side to the inner and outer tent layer 106' and 106.

The preferred embodiments of the quilted tent 100 have other features that enable all season use and use in extreme conditions. As the reflective nature and insulating layer prevents exterior heating in hot climates may be both a water and gas barrier, there is also a need for venting. Windows provide venting under cooler conditions. Such features can be used with fabrics that are not reflective or do not have reflective layer, or have only interior reflective layers.

The preferred embodiment of the windows allows the draining of water when the window is closed.

The tent 100 also has vents to exchange air. The vents prevent in flow of water, but include filter pockets so that filters can be inserted. Such filters prevent fine sand and dust ingress. The filters can be removed and cleaned or replaced from the pockets. By filter, we mean any air permeable member capable of trapping airborne particulate and/or absorbing and/or neutralizing hazardous gases or vapors, which can be fabricated from papers, fiber, non-woven and woven fabric, reticulated matter and combination thereof. Such filter may contain activated carbon or other absorbing materials. It should be understood that filters generally have microscopic or sub-millimeter openings and can readily clog during extensive use, and thus may need frequent replacement or cleaning. By a mesh opening, we mean larger aperture between the members of the mesh, such as about millimeter sized, which can include fractions of a millimeter, to support a filter with much smaller pore or opening. The mesh is less likely to clog, being primarily an insect screen and support for the filter, and can be cleaned in place. The mesh can also be removable and replaceable or on a flap member the folds away from the opening.

The tent 100 also has sealable portal or feedthroughs near the bottom or base for heating and cooling ducts, electric power cord connectors and optional insertion of water feed and drain hoses for plumbing and fresh water supply.

The hubs that form the support for the roof and sidewalls are preferably cam style hubs, such as those known in the prior art, such as U.S. Pat. No. 6,296,415B1 and U.S. Pat. No. 8,448,656B2, which are incorporated herein by reference. The spokes 116 and struts 125 are capable of latching in a first rotated orientation with respect to the hub 115/124 in which the distal ends 116b and 125b are all extend out radially away for the hub 115/124 and in a second state for collapsing the insulated tent structure 100 in which the spokes 116 and struts 125 rotate at hinge 124a with respect the hub 124 or 115 to bring the distal ends 116b and 125b together. A user needs to deploy force to rotate the struts at hinge 124a between the first and second state that overcome the latching strength of the hinge 124a. Each hub 115/124 has a handle, such as loop 1242 in FIG. 8 (which was disclosed in commonly owned U.S. Appl. No. 62/291,838 filed on 5 Feb. 2016) for pulling outward the strut to erect the insulated tent 100. Appl. No. 62/291,838 is incorporated herein by reference and is included as an Appendix to this application.

Figure 5:
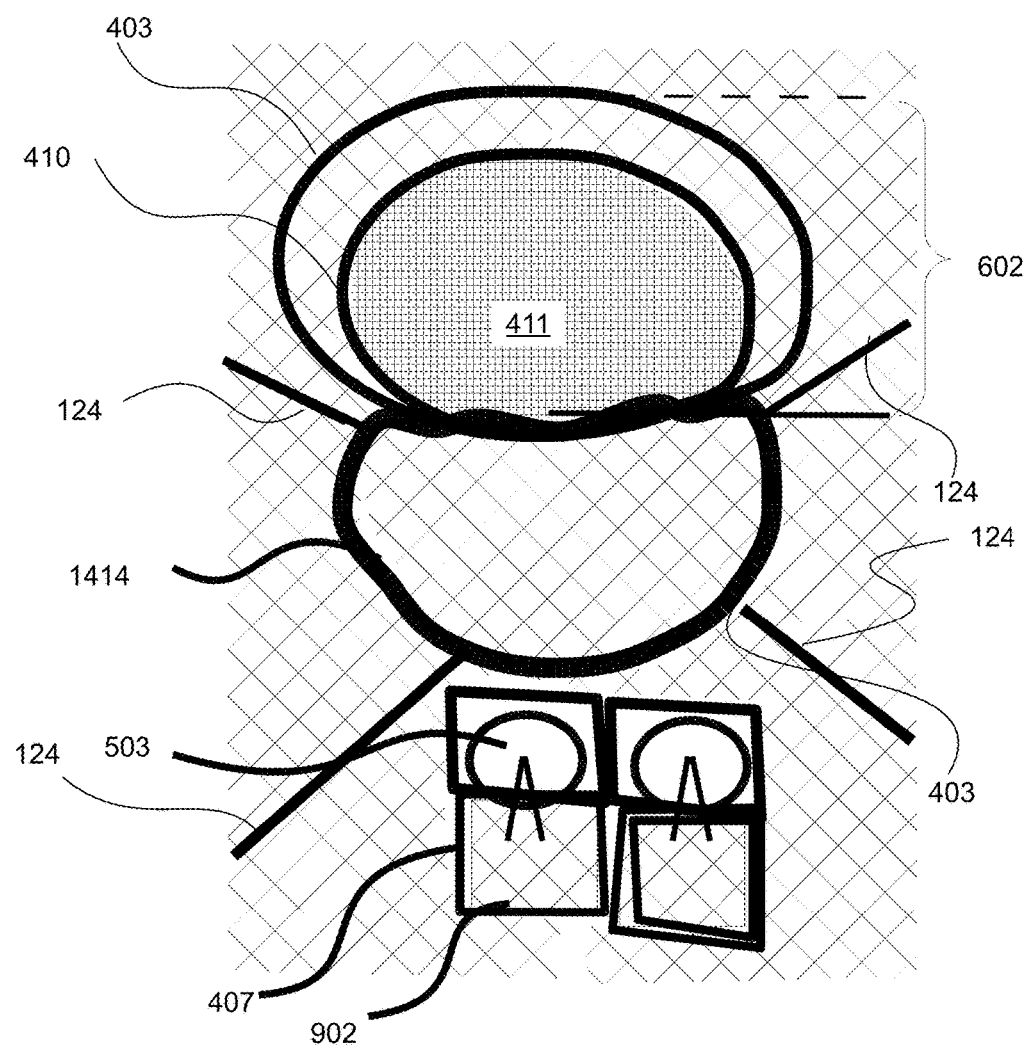
FIG. 5 is a perspective view of an interior portion of the tent of FIG. 1 showing the sealable screened windows and a lower adjacent portion for receiving ventilation ducts.
Figure 6:
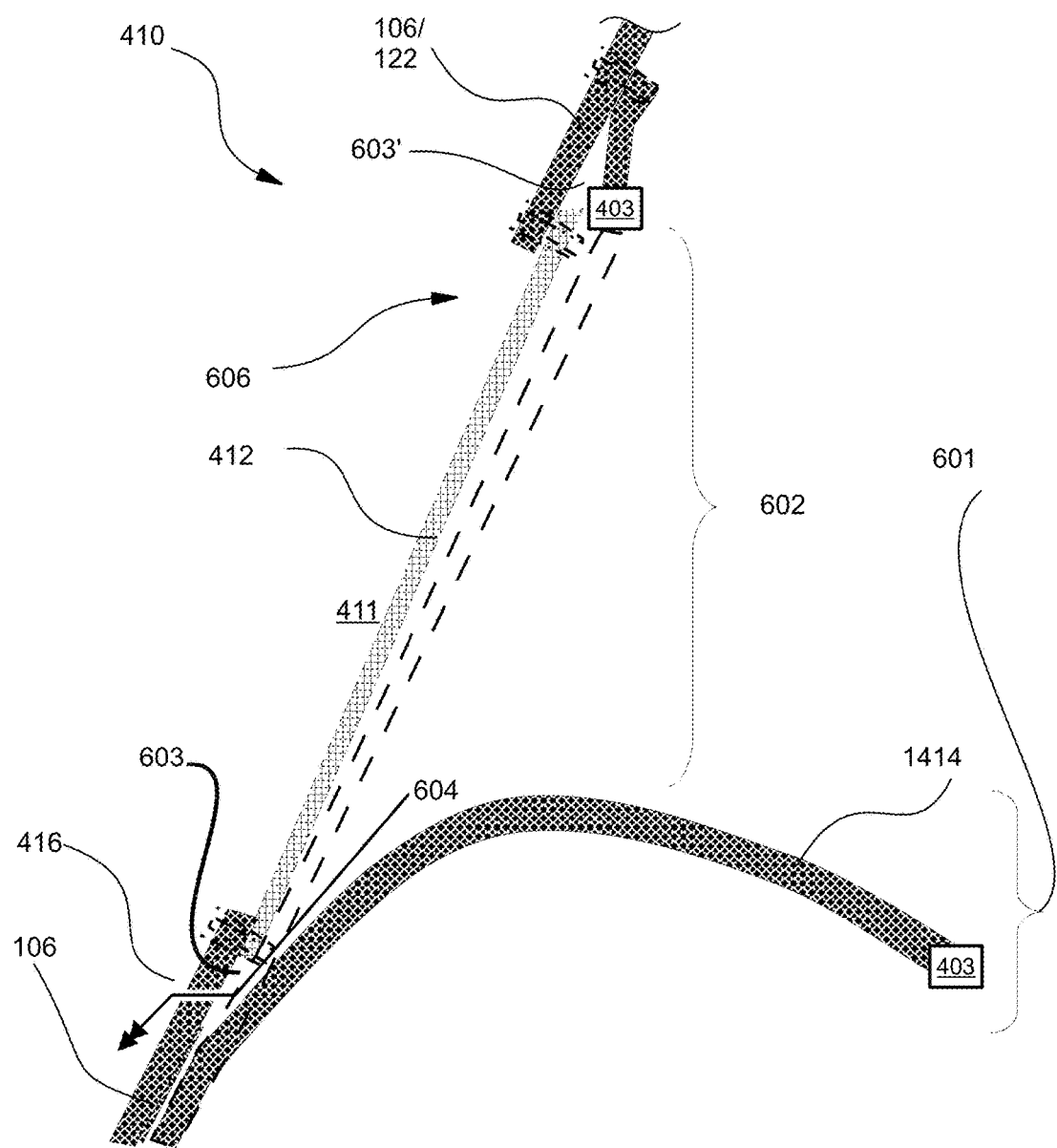
FIG. 6 is a schematic cross-sectional elevation view of the windows in FIGS. 1 and 5.
Figure 7:
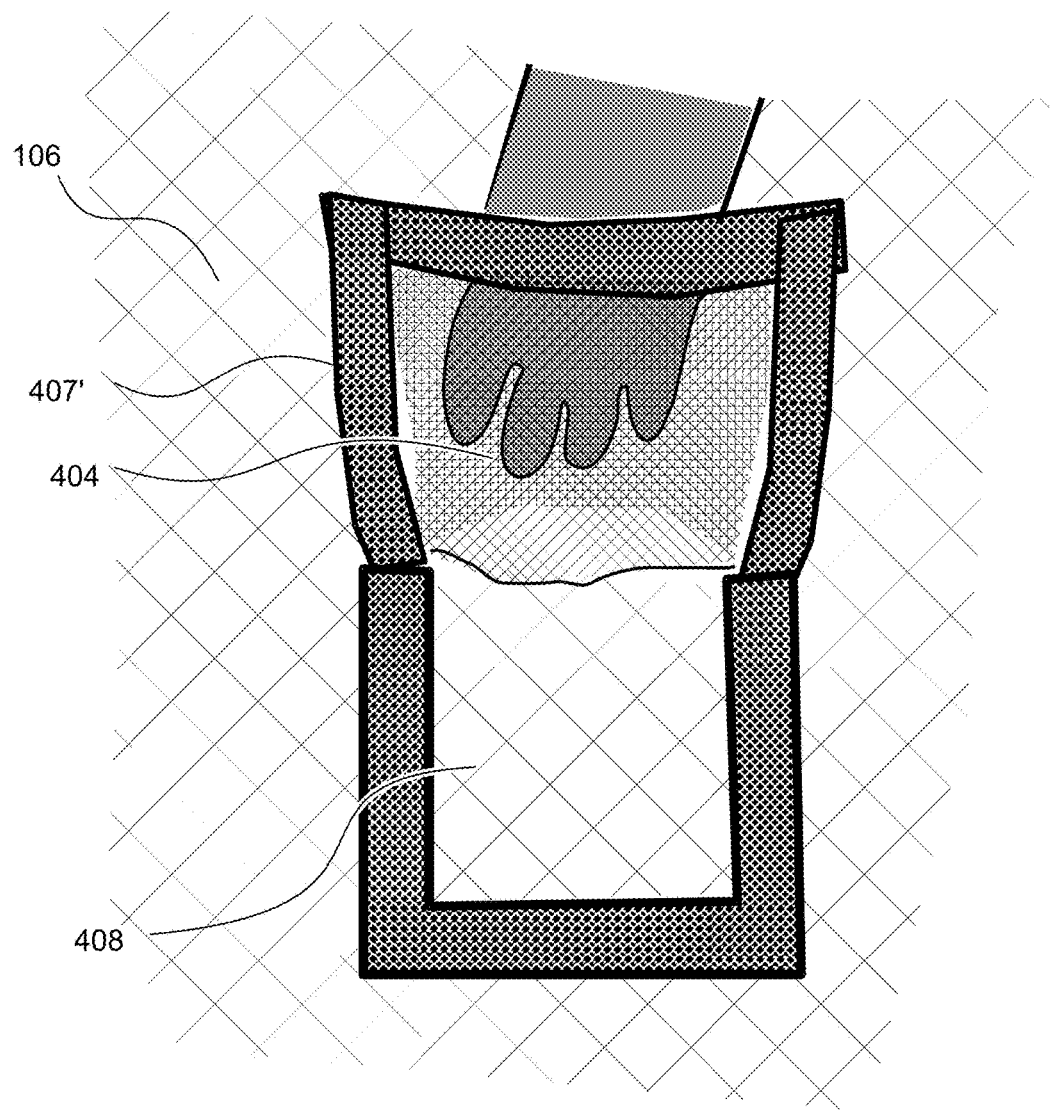
FIG. 7 is a perspective view of an interior portion of the tent of FIG. 1 showing the vent of FIG. 5 open to illustrate the pocket for receiving a filter. A hand is partly inserted into the pocket.

As shown in FIGS. 5 and 6, among others, the insulated tent 100 also preferably has one or more screened windows or portal 410 on one or more side walls 122, as well as one of more air vents 410, that are also preferably screened.

The window 410 in FIG. 5 though 6 has a screen member 412 that fills the opening 411. The inside of the window 410, behind the screen 412, is closed by a flap segment, which is preferably circular 1414 of the reflective fabric, which is attached at an upper perimeter, region 602, by a zipper 403, but is stitched at a lower perimeter portion to the tent outer layer 106 of the wall 122 to provide at a lower perimeter portion an annular V-shaped trough 603. The upper periphery 602 of the circular segment or flap 1414 is removably attached to the surrounding wall 122 by a zipper 403. The zipper 403 is used to close the opening on the inside of the screen 412, such as for privacy or to exclude the elements, such as dust, sand or rain. The opening 411 has an annular overhanging portion 606 of the tent outer layer 106 created by the space between the tent outer cover layer 106 and the internal attachment of circular segment 1414 via zipper 403, which defines the upper portion of the V-shaped annular trough 603'. When the zipper 403 is closed any rain or melting snow entering the screen will contact the flap segment 1414 and then flow downward into the lower portion of the annular V-shaped trough 603, eventually draining at the bottom via one or more, but preferably 3, open rivets 416, flowing in the direction of arrow 604.

The vent 410 in FIGS. 5-6 and 8 has an outer cover 402 that sheds rain off the opening 403. The outer cover 402 is stitched to the tent outer layer 106 above and at the sides of the opening 402. The rigid nature of the reflective fabric cover material 402 forces it to extend out away from the opening at the bottom forming a part conical covering that is opening at the bottom. The opening in the tent side wall is covered by a mesh pocket 404 by inner 405 and outer 406 mesh screen that is sealed by a hook and loop fastening strap 407 at the top. A filter can be inserted in the mesh pocket (in the direction of arrow 401a) to capture fine sand and dust in desert conditions. The inside of the opening can preferably be closed by a segment 408 of the covering fabric, which can be held in placed by hook and loop fastening strips 407' around the perimeter thereof to mating fastener at the perimeter of the opening.

A similar vent outer cover 502 is used on the ventilation, hose and electrical cord openings shown in FIGS. 5 and 9-12. In place of the mesh pocket, a sock or tube like fabric cone 503 fills the opening in the wall. Cone 503 is configured to expand and contract to seal a ventilation duct that fills the opening in the wall. The sock or tube 503 is closed at an inner perimeter 503i around a cord, hose or duct by a cinch cord and/or elastic closure ring 504. The cord 504 can be used to close the opening, or the inherent elastic tightening of the ring can close the sock around the penetrating cord, hose or duct. The sock 503 has an outer perimeter 503p that is attached at the periphery of the opening 505 in the tent side wall. An inner flap 902 is disposed on the opposing side of the hole 505 from the sock 503, and is deployed to seal the opening by connection of the perimeter 902p with a strip of mating hook and loop fastening material or strip 407.

Figure 10:
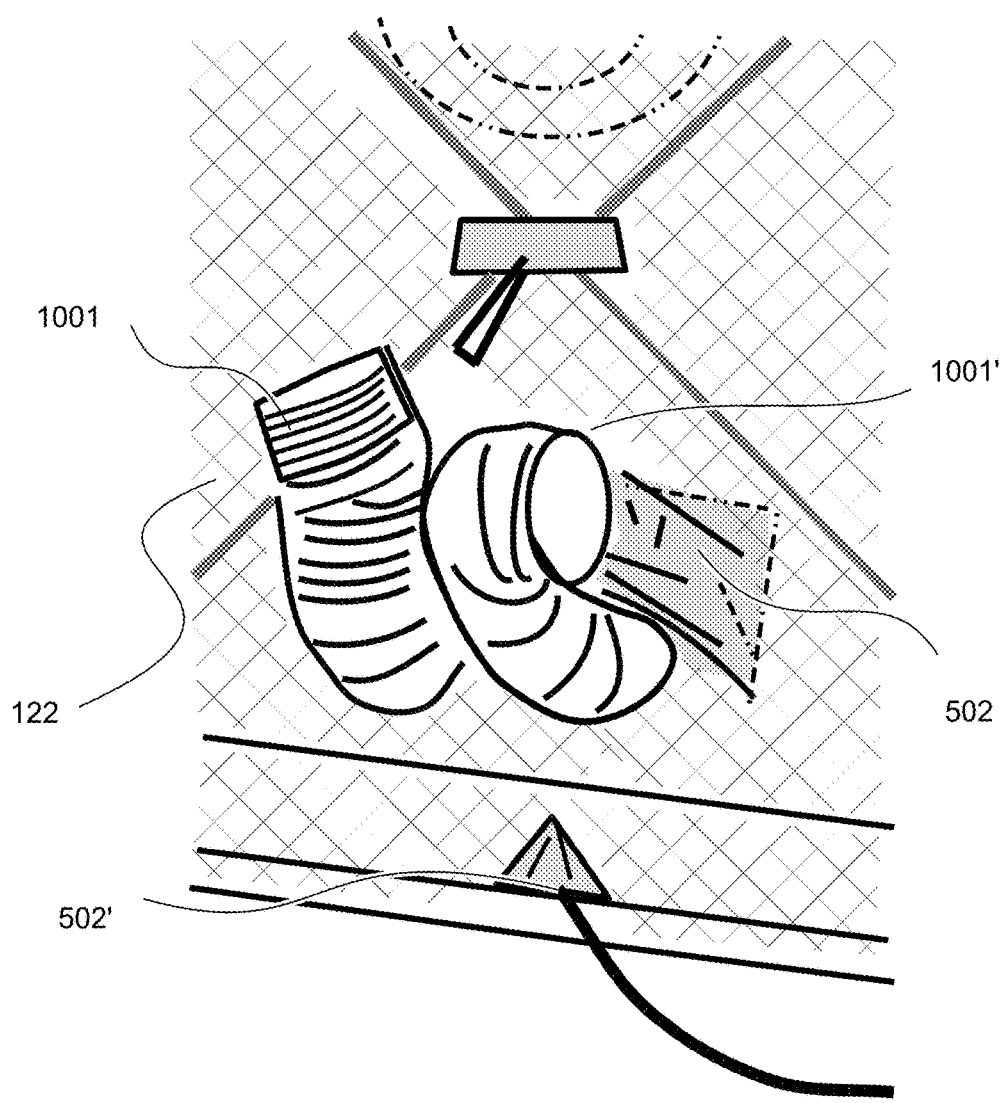
FIG. 10 is a perspective view of an exterior portion of the tent of FIG. 1 showing the covered ventilation ducts couplings.
Figure 11:
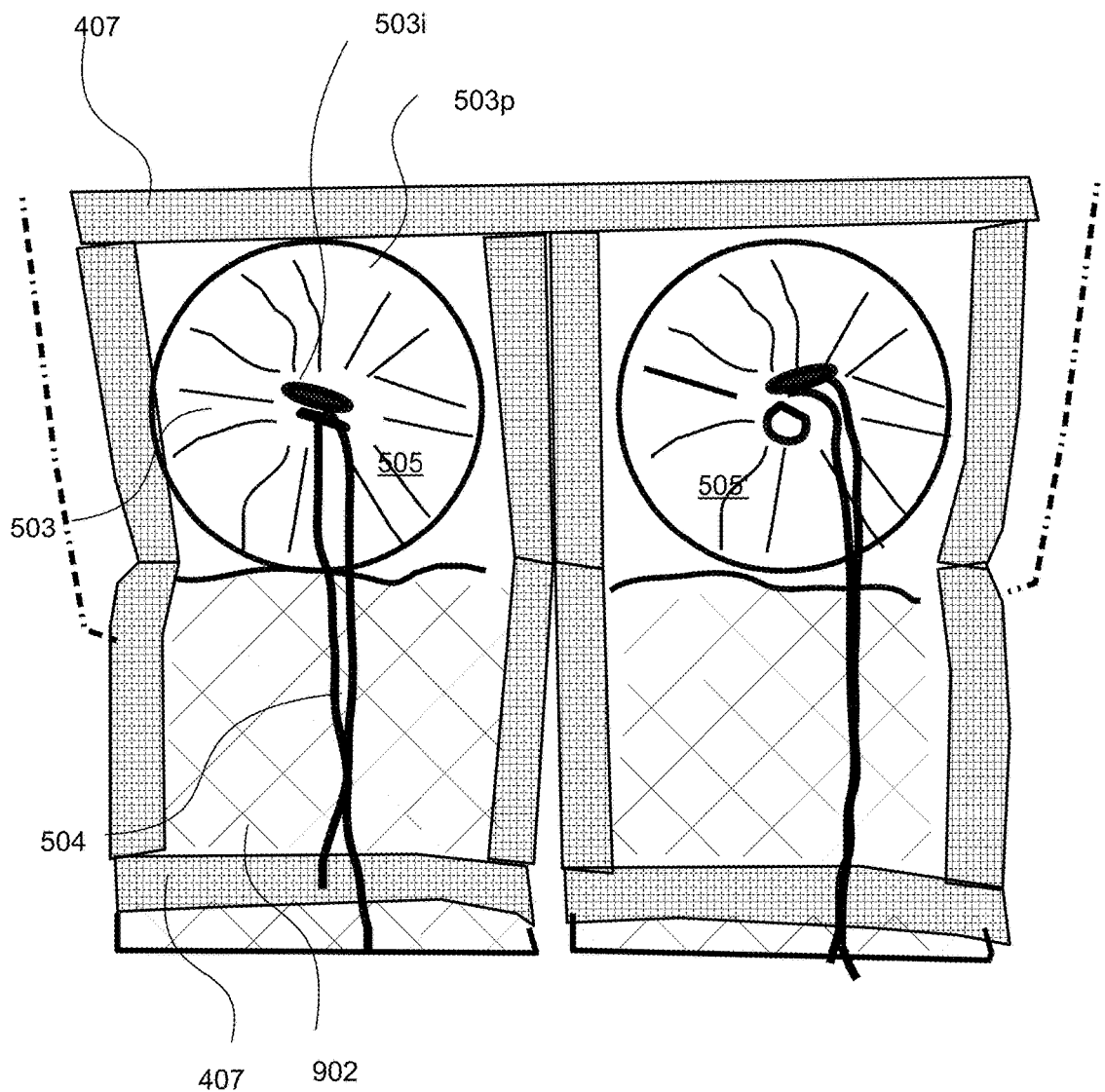
FIG. 11 is a perspective view of an interior portion of the tent of FIG. 1 showing the receptacles for sealing the ventilation ducts couplings.
Figure 12:
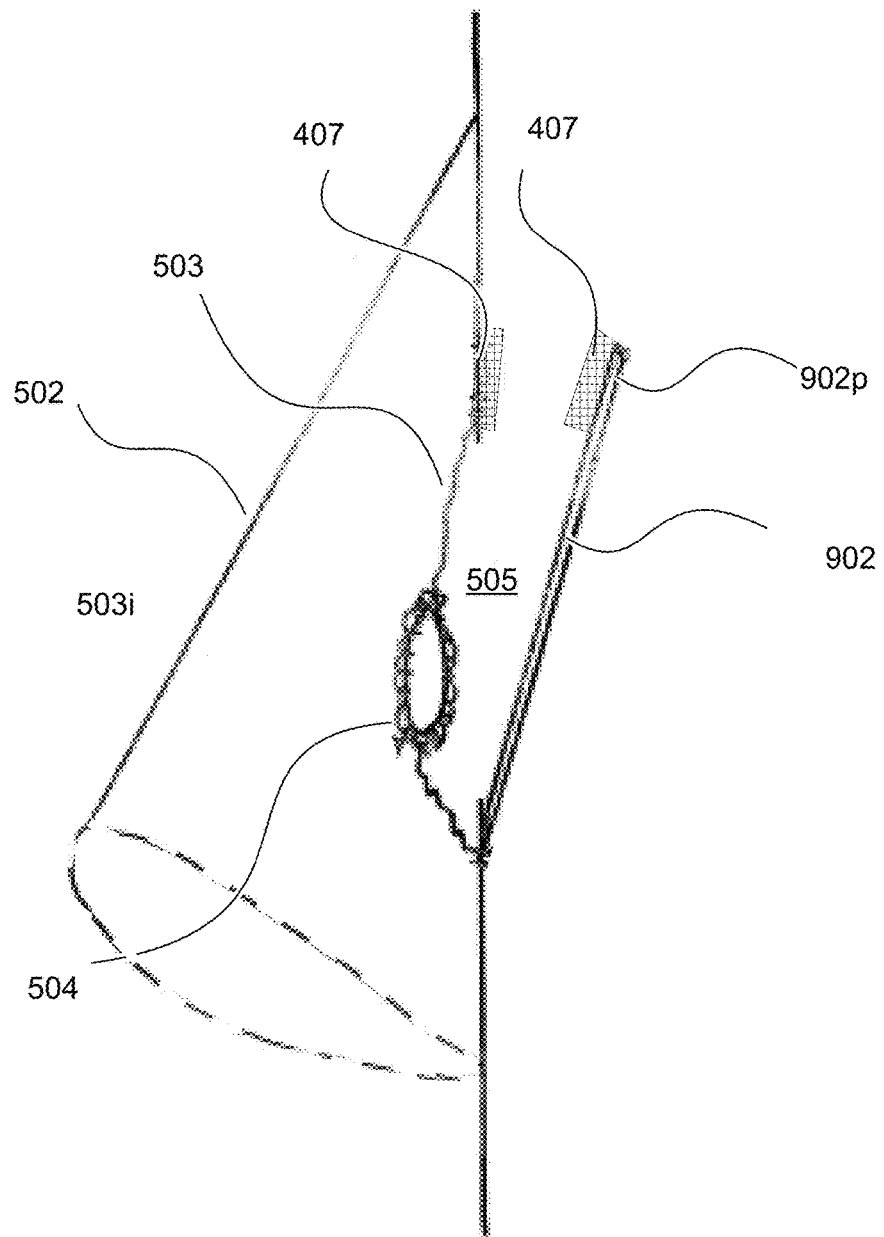
FIG. 12 is a schematic cross-sectional elevation view of the tent sidewall at the ducts and cord covers of FIG. 9-11.

The penetration of the hose, cord, or duct allows for running, water, electricity or ventilation in the tent in extreme conditions. Similar to the inner window covering, inner cover formed of the tent fabric is attached from the inside to close the opening when a cord, hose or duct is not in place. As shown in FIG. 10-11, adjacent vent ports are provided for installing a portable air conditioner, in which outside air comes in one duct, and hot air, or A/C exhaust, is vented out the other duct. The other sealable vent can be used for the electrical power cord to power the portable air conditioner. FIG. 10 shows the exterior of the ten at side wall 122 with the 2 corrugated ventilation hoses 1001 entering the separate holes 505 and 505' covered the common vent outer cover 502. FIG. 10 also shows a power cord entering the lower vent cover. It should be appreciated that the vent covers 502 can be made of the same water proof fabric or material as the tent outer layer 106, or a different material.

The insulated tent 100 also preferably has at least one or more access panels 129, such as a triangle portion of sidewall 122 defined by the zipper connection 123 to adjacent portions.

It should be appreciated that while the portable insulated tent is illustrated as a hexagon shape, it can have any other shaper of the sidewall and roof, and multiple structure of the same or different shape can be linked to form larger structure or attached to expand or provide entrances to more permanent insulated tents.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

I claim:

1. A collapsible insulated tent structure comprising:
 a) a frame that comprises:
  i) a roof formed with a centrally disposed roof hub at an apex, the hub having 3 or more hinged outwardly extending struts, with each adjacent pairs of strut supporting a portion of a flexible fabric cover member by forming a triangular downward sloping roof panel,
  ii) three or more sides walls formed of the cover member, each sidewall extending downward from an upper side at an edge of the roof panel and supported by a centrally disposed sidewall hub having at least three hinged outwardly extending struts,
  iii) wherein the cover member has a plurality of elongated pocket sets, the pockets in each set extending from a common proximal end to receive and secure the distal end of the approaching struts from the roof and sidewall hubs,
  iv) wherein at least a portion of the flexible fabric cover member is a reflective fabric that has quilted pockets defined by seams having a linear sequence of adjacent weld points that bond an external fabric layer to one or more additional layers, wherein the weld points have a diameter of 0.5 to 1 mm are spaced apart by a gap of 1 to 5 mm.

2. The collapsible insulated tent structure of claim 1 wherein the reflective fabric has one or more layers of a metallic or Infrared radiation reflecting materials.

3. The collapsible insulated tent structure of claim 1 wherein the flexible fabric cover member has quilted pockets that contain a batting of inter-tangled fibers in which individual fibers are longer than the gap between adjacent weld points.

4. The collapsible insulated tent structure of claim 1 wherein the reflective fabric has at least one Infrared reflective layer disposed between an interior fabric layer and an exterior fabric layer.

5. The collapsible insulated tent structure of claim 1 wherein the external fabric layer comprises one or more metallic or Infrared radiation reflecting materials.

6. A collapsible insulated tent structure comprising:
 a) a frame that comprises:
  i) a roof formed with a centrally disposed roof hub at an apex, the hub having 3 or more hinged outwardly extending struts, with each adjacent pairs of struts supporting a portion of an outer cover layer by forming a triangular downward sloping roof panel, ii) three or more sides walls formed of the outer cover layer, each sidewall extending downward from an upper side at an edge of the roof panel and supported by a centrally disposed sidewall hub having at least three hinged outwardly extending struts, iii) wherein the an inner side of the outer cover layer has a plurality of elongated pocket sets, the pockets in each set extending from a common proximal end to receive and secure the distal end of the approaching struts from the roof and sidewall hubs, b) one or more window openings in the outer cover layer, c) a mesh screen covering at least one of the one or more window openings, d) an inner cover disposed on a side of the mesh screen that is opposite the outer cover layer to be within an inside of the collapsible insulated tent structure, the inner cover having a perimeter that is connected to the outer cover layer beyond a perimeter of the window opening, the inner cover further comprising:

i) a lower portion, and ii) a semi-circular upper portion above the lower portion that is circumscribed by a zipper connection with the outer cover, e) a plurality of perforations disposed on a portion of the outer cover layer that are opposite the lower portion of the inner cover to drain any precipitation that may collect in an annular V-shaped trough defined by a region between the outer cover layer and a perimeter of the inner cover.

7. A collapsible insulated tent structure comprising:

a) a frame that comprises:

i) a roof formed with a centrally disposed roof hub at an apex, the hub having 3 or more hinged outwardly extending struts, with each adjacent pairs of strut supporting a portion of a flexible fabric cover member by forming a triangular downward sloping roof panel, ii) three or more sides walls formed of the flexible fabric cover member, each sidewall extending downward from an upper side at an edge of the roof panel and supported by a centrally disposed sidewall hub having at least three hinged outwardly extending struts, iii) wherein the flexible fabric cover member has a plurality of elongated pocket sets, the pockets in each set extending from a common proximal end to receive and secure the distal end of the approaching struts from the roof and sidewall hubs, b) wherein the flexible fabric cover has two or more vent openings, each vent opening having attached about a perimeter of the vent opening a fabric cone configured to expand and contract to seal a ventilation duct that extends from outside the tent structure via each of the two or more vent opening, c) an inner flap disposed on an interior of the flexible fabric cover in detachable engagement over the two or more vent openings to protect the insulated tent structure from an external environment when the ventilation duct is not disposed in each of the two or more vent openings, and d) at least one outer cover attached to an upper end and adjacent opposing sides on the exterior of the flexible fabric cover about at least one vent opening in which the outer cover extends away from the vent opening so that it is operative to direct away precipitation away from the vent opening.

8. The collapsible insulated tent structure of claim 7 wherein the fabric cone is configured to be closed at an inner perimeter around a ventilation duct by one of a cinch cord and an elastic closure ring.

9. A collapsible insulated tent structure comprising:

a) a frame that comprises:

i) a roof formed with a centrally disposed roof hub at an apex, the hub having 3 or more hinged outwardly extending struts, with each adjacent pairs of strut supporting a portion of a flexible fabric cover member by forming a triangular downward sloping roof panel, ii) three or more sides walls formed of the cover member, each sidewall extending downward from an upper side at an edge of the roof panel and supported by a centrally disposed sidewall hub having at least three hinged outwardly extending struts, iii) wherein the cover member has a plurality of elongated pocket sets, the pockets in each set extending from a common proximal end to receive and secure the distal end of the approaching struts from the roof and sidewall hubs, b) wherein at least a portion of the flexible fabric cover is a reflective fabric that has quilted pockets defined by seams having a linear sequence of adjacent weld points separated by a gap, in which the weld points bond an external fabric layer to one or more additional layers and the quilted pockets contains a batting of intertangled fibers in which individual fibers longer than the gap between adjacent weld points.

10. The collapsible insulated tent structure of claim 9 wherein said gap between said adjacent weld points is 1 to 5 mm and wherein said adjacent weld points have a diameter of 0.5 to 1 mm.

11. The collapsible insulated tent structure of claim 10 wherein the reflective fabric has one or more layers of a metallic or Infrared radiation reflecting materials.

12. The collapsible insulated tent structure of claim 9 wherein the reflective fabric has one or more layers of a metallic or Infrared radiation reflecting materials.

13. The collapsible insulated tent structure of claim 12 wherein the one or more layers of a metallic or Infrared radiation reflecting is on the exterior fabric layer.

* * * * *